US012568052B2

(12) United States Patent
Radi et al.

(10) Patent No.: US 12,568,052 B2
(45) Date of Patent: Mar. 3, 2026

(54) DATA TRANSMISSION SCHEDULING FOR DISAGGREGATED MEMORY SYSTEMS

(71) Applicant: Western Digital Technologies, Inc., San Jose, CA (US)

(72) Inventors: Marjan Radi, San Jose, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 301 days.

(21) Appl. No.: 18/233,223

(22) Filed: Aug. 11, 2023

(65) Prior Publication Data

US 2025/0007854 A1     Jan. 2, 2025

Related U.S. Application Data

(60) Provisional application No. 63/523,608, filed on Jun. 27, 2023.

(51) Int. Cl.
    *H04L 47/625*      (2022.01)
    *H04L 47/6275*     (2022.01)
    *H04L 67/1097*     (2022.01)

(52) U.S. Cl.
    CPC ...... *H04L 47/6255* (2013.01); *H04L 47/6275* (2013.01); *H04L 67/1097* (2013.01)

(58) Field of Classification Search
    CPC ............. H04L 47/6255; H04L 47/6275; H04L 67/1097
    See application file for complete search history.

(56) References Cited

U.S. PATENT DOCUMENTS 6,400,410 B1 *   6/2002   Timmer ................ G06F 9/4881
                                                     348/706
7,016,367 B1 *   3/2006   Dyckerhoff ........... H04L 49/552
                                                     370/429
(Continued)

FOREIGN PATENT DOCUMENTS

CN           108353040 A  *  7/2018   ........... H04L 69/324
CN           111742305 A  *  10/2020   ......... G06F 13/1626
(Continued)

OTHER PUBLICATIONS

Al-Fares et al.; "Hedera: Dynamic Flow Scheduling for Data Center Networks"; Apr. 2010; available at: https://dl.acm.org/doi/10.5555/1855711.1855730.
(Continued)

*Primary Examiner* — Shean Tokuta
(74) *Attorney, Agent, or Firm* — Barry IP Law, P.C.

(57)                    ABSTRACT
A processing node executes one or more applications that are allocated memory of at least one shared memory of one or more memory nodes via a network. Packets including memory messages for memory nodes are enqueued into one or more transmission queues for sending the packets to the memory nodes. Each packet is enqueued into a transmission queue according to the application issuing the memory message included in the packet. One or more time slots of a predetermined time period are assigned to a transmission queue for sending at least a portion of the packets enqueued in the transmission queue within the assigned one or more time slots. At least a portion of the packets from the transmission queue are sent during the one or more assigned time slots. In one aspect, time slots are assigned based on scheduling information from a network scheduling device.

20 Claims, 6 Drawing Sheets

(56) References Cited

U.S. PATENT DOCUMENTS

| | | | | |
|---|---|---|---|---|
| 7,349,418 | B1 * | 3/2008 | Cohen | H04L 49/9094 |
| | | | | 370/468 |
| 9,823,840 | B1 | 11/2017 | Brooker et al. | |
| 10,237,199 | B2 * | 3/2019 | Szymanski | H04L 47/30 |
| 11,134,025 | B2 | 9/2021 | Billore et al. | |
| 11,431,645 | B2 | 8/2022 | Zhou et al. | |
| 2004/0037558 | A1 * | 2/2004 | Beshai | H04J 14/08 |
| | | | | 398/47 |
| 2013/0007755 | A1 | 1/2013 | Chambliss et al. | |
| 2016/0043973 | A1 * | 2/2016 | Drouin | H04L 51/063 |
| | | | | 709/206 |
| 2016/0070496 | A1 | 3/2016 | Cohen et al. | |
| 2017/0034297 | A1 | 2/2017 | Waheed | |
| 2018/0089119 | A1 * | 3/2018 | Khan | G06F 9/5077 |
| 2018/0295052 | A1 * | 10/2018 | St-Laurent | H04L 69/329 |
| 2019/0243762 | A1 | 8/2019 | Birke et al. | |
| 2020/0145329 | A1 * | 5/2020 | St-Laurent | H04L 47/50 |
| 2020/0322287 | A1 | 10/2020 | Connor et al. | |
| 2021/0240616 | A1 | 8/2021 | Stabrawa et al. | |
| 2022/0103530 | A1 * | 3/2022 | Daly | H04L 47/781 |
| 2022/0179585 | A1 * | 6/2022 | Muthiah | G06F 3/0673 |
| 2022/0278911 | A1 | 9/2022 | Padala et al. | |
| 2024/0054079 | A1 | 2/2024 | Han et al. | |
| 2025/0254681 | A1 * | 8/2025 | Jain | H04W 72/542 |

FOREIGN PATENT DOCUMENTS

| | | | | | | |
|---|---|---|---|---|---|---|
| CN | 113672398 | A | * | 11/2021 | | G06F 9/505 |
| CN | 116149867 | A | * | 5/2023 | | G06F 9/5038 |
| FR | 3117641 | A1 | * | 6/2022 | | H04L 67/1001 |
| JP | 6886013 | B2 | * | 6/2021 | | G06F 9/5077 |
| WO | WO-2017132774 | A1 | * | 8/2017 | | H04L 63/1458 |
| WO | 2018086569 | A1 | | 5/2018 | | |
| WO | WO-2022169519 | A1 | * | 8/2022 | | H04L 49/9057 |
| WO | WO-2022264230 | A1 | * | 12/2022 | | H04L 12/28 |
| WO | WO-2023089785 | A1 | * | 5/2023 | | H04L 7/00 |

OTHER PUBLICATIONS

Chen et al.; Resource abstraction and data placement for distributed hybrid memory pool; Nov. 2019; available at: https://link.springer.com/article/10.1007/s11704-020-9448-7.

Lebeane et al.; "Data Partitioning Strategies for Graph Workloads on Heterogeneous Clusters"; Nov. 2015; available at: https://ieeexplore.ieee.org/document/7832830.

Lee et al.; "MIND: In-Network Memory Management for Disaggregated Data Centers"; Oct. 2021; available at: https://arxiv.org/abs/2107.00164.

Neves et al.; "Black-box inter-application traffic monitoring for adaptive container placement"; Mar. 2020; available at: https://dl.acm.org/doi/10.1145/3341105.3374007.

Raza et al.; "A Priority Based Greedy Path Assignment Mechanism in OpenFlow Based Datacenter Networks"; Aug. 2020; available at: https://www.sciencedirect.com/science/article/abs/pii/S1084804520301272.

Schweissguth et al.; "Application-Aware Industrial Ethernet Based on an SDN-Supported TDMA Approach"; May 2006; available at: https://ieeexplore.ieee.org/document/7496496.

Vattikonda et al.; "Practical TDMA for Datacenter Ethernet"; Apr. 2012; available at: https://dl.acm.org/doi/10.1145/2168836.2168859.

Xie et al.; "Improving MapReduce Performance through Data Placement in Heterogeneous Hadoop Clusters"; Apr. 2010; available at: https://ieeexplore.ieee.org/document/5470880.

Zhong et al.; "BPF for Storage: An Exokernel-Inspired Approach"; May 2021; available at: https://arxiv.org/abs/2102.12922.

Pending U.S. Appl. No. 18/232,224, filed Aug. 9, 2023, entitled "Disaggregated Memory Management", Marjan Radi.

Pending U.S. Appl. No. 18/232,780, filed Aug. 10, 2023, entitled "Disaggregated Memory Management for Virtual Machines", Marjan Radi.

* cited by examiner

16

| App./Queue | Priority | DF Length | Time Limit | Packets in Queue | Pending Mem. Req. |
|------------|----------|-----------|------------|------------------|-------------------|
| A | 2 | 7 | 8 ms | 7 | 8 |
| B | 3 | 2 | 8 ms | 2 | 2 |
| C | 1 | 10 | 5 ms | 5 | 16 |

Assigned Time Slots:     3          1          4

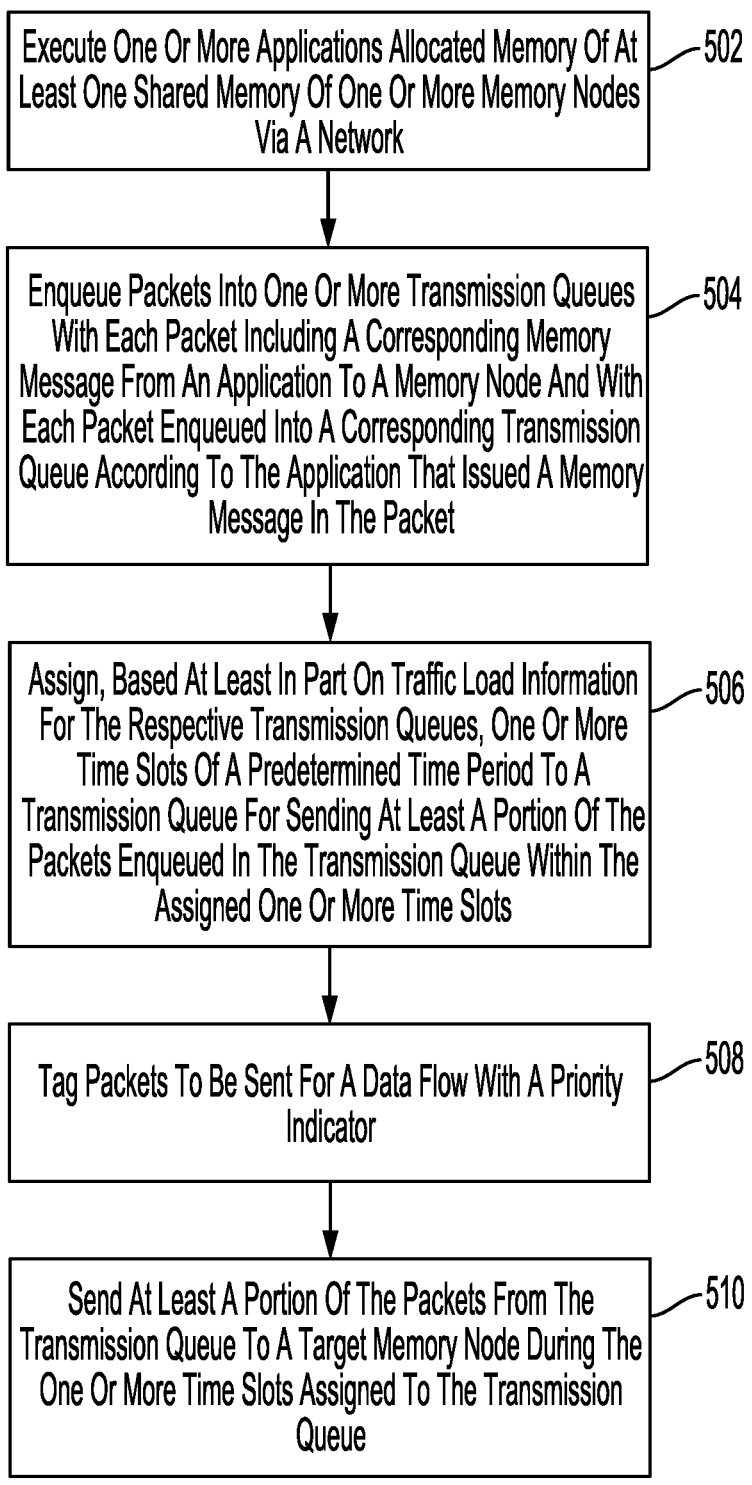

Execute One Or More Applications Allocated Memory Of At Least One Shared Memory Of One Or More Memory Nodes Via A Network ⟋502

Enqueue Packets Into One Or More Transmission Queues With Each Packet Including A Corresponding Memory Message From An Application To A Memory Node And With Each Packet Enqueued Into A Corresponding Transmission Queue According To The Application That Issued A Memory Message In The Packet ⟋504

Assign, Based At Least In Part On Traffic Load Information For The Respective Transmission Queues, One Or More Time Slots Of A Predetermined Time Period To A Transmission Queue For Sending At Least A Portion Of The Packets Enqueued In The Transmission Queue Within The Assigned One Or More Time Slots ⟋506

Tag Packets To Be Sent For A Data Flow With A Priority Indicator ⟋508

Send At Least A Portion Of The Packets From The Transmission Queue To A Target Memory Node During The One Or More Time Slots Assigned To The Transmission Queue ⟋510

FIG. 5

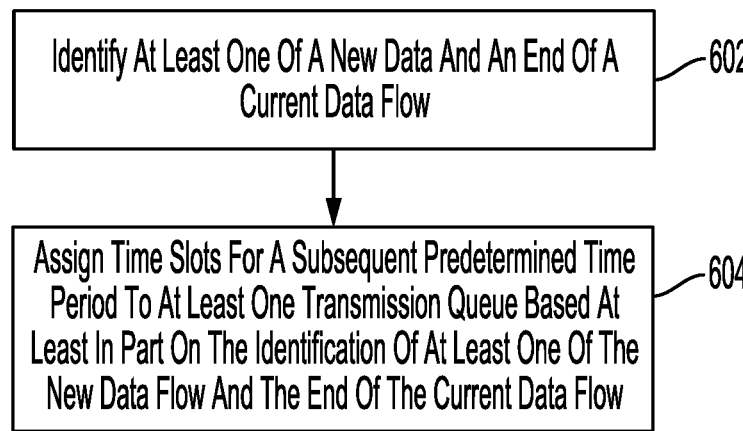

| Identify At Least One Of A New Data And An End Of A Current Data Flow | — 602 |

| Assign Time Slots For A Subsequent Predetermined Time Period To At Least One Transmission Queue Based At Least In Part On The Identification Of At Least One Of The New Data Flow And The End Of The Current Data Flow | — 604 |

FIG. 6

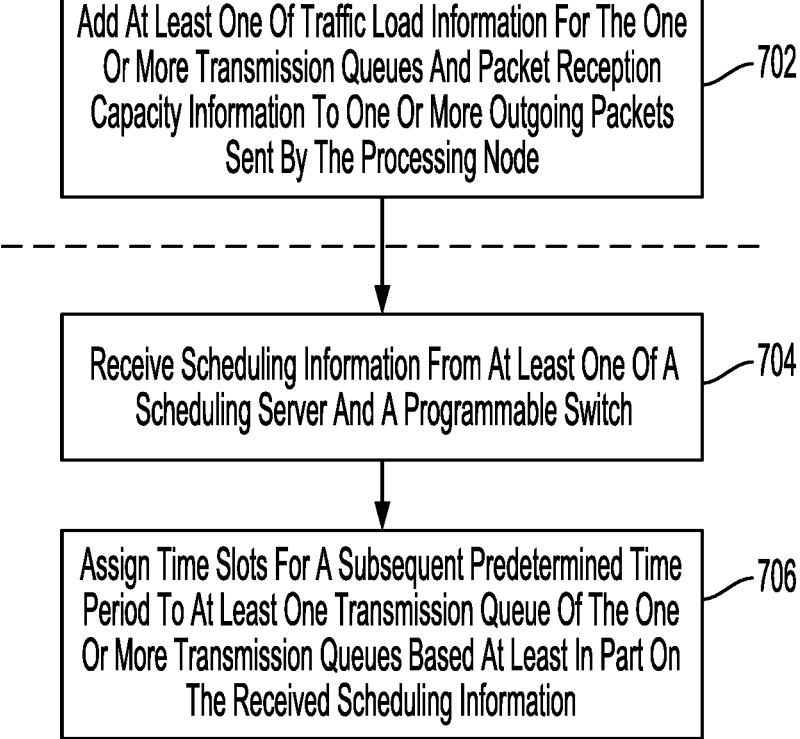

| Add At Least One Of Traffic Load Information For The One Or More Transmission Queues And Packet Reception Capacity Information To One Or More Outgoing Packets Sent By The Processing Node | — 702 |

| Receive Scheduling Information From At Least One Of A Scheduling Server And A Programmable Switch | — 704 |

| Assign Time Slots For A Subsequent Predetermined Time Period To At Least One Transmission Queue Of The One Or More Transmission Queues Based At Least In Part On The Received Scheduling Information | — 706 |

FIG. 7

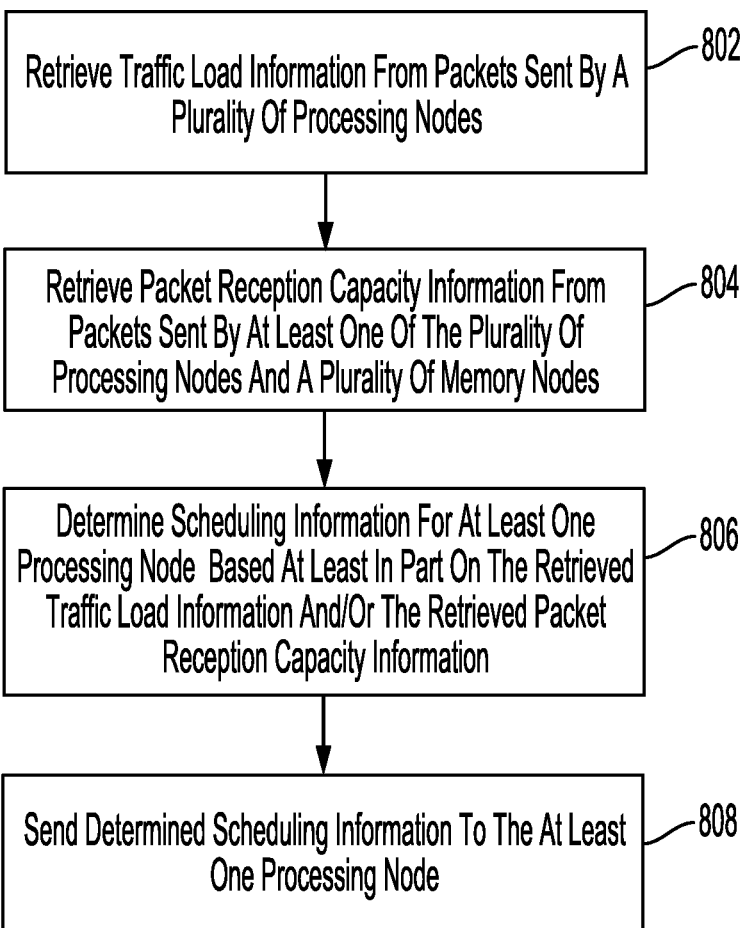

Retrieve Traffic Load Information From Packets Sent By A Plurality Of Processing Nodes — 802

Retrieve Packet Reception Capacity Information From Packets Sent By At Least One Of The Plurality Of Processing Nodes And A Plurality Of Memory Nodes — 804

Determine Scheduling Information For At Least One Processing Node Based At Least In Part On The Retrieved Traffic Load Information And/Or The Retrieved Packet Reception Capacity Information — 806

Send Determined Scheduling Information To The At Least One Processing Node — 808

FIG. 8

DATA TRANSMISSION SCHEDULING FOR DISAGGREGATED MEMORY SYSTEMS

CROSS-REFERENCE TO RELATED APPLICATION

This application claims the benefit of U.S. Provisional Application No. 63/523,608 titled "DATA TRANSMISSION SCHEDULING FOR DISAGGREGATED MEMORY SYSTEMS", filed on Jun. 27, 2023, which is hereby incorporated by reference in its entirety.

BACKGROUND

Current trends in cloud computing, big data, machine learning, and Input/Output (I/O) intensive applications have led to greater needs for large-scale, shared memory systems. In addition, the proliferation of varying computing applications in data centers, such as with cloud computing, has led to greater diversity in memory requirements and network traffic among the different applications in large-scale, shared memory systems. Memory disaggregation is currently being used to support more efficient resource management and low-latency memory access. In addition, high-performance memory devices, such as Non-Volatile Memory express (NVMe®) devices are becoming more prevalent in data centers with NVMe over Fabric (NVMe-oFT) extensions for remote memory access that approaches a similar performance as using locally attached memory or storage. However, such disaggregated memory or storage access using NVMeoF relies on a network that introduces transmission latencies, throughput limitations, and the need to share network resources among different applications running at the processing nodes.

The growing interest in memory disaggregation in data centers and the competing network demands of different applications has led to interest in using Time Division Multiple Access (TDMA) link scheduling in memory systems to attempt to guarantee performance for the different applications, support fair network bandwidth allocation, and alleviate network congestion. However, current TDMA approaches typically use centralized scheduling and synchronization throughout the network, which creates several limitations that make such approaches inadequate for large-scale data centers employing disaggregated and often heterogeneous memory pools that include different types of memory devices. Such limitations can include restricted scalability, delayed adaptation to changing data flows from the processing nodes, a heavy operational overhead, and additional hardware. These limitations to current TDMA approaches generally make them unsuitable for large-scale data centers and cloud systems that often include heavy and dynamic network resource demands.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 5 is a flowchart for a data transmission scheduling process according to one or more embodiments.

FIG. 6 is a flowchart for a time slot reassignment process according to one or more embodiments.

FIG. 7 is a flowchart for a data transmission scheduling process based on scheduling information received from a network scheduling device according to one or more embodiments.

FIG. 8 is a flowchart for a scheduling information determination process performed by a network scheduling device according to one or more embodiments.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Environments

Figure 1:
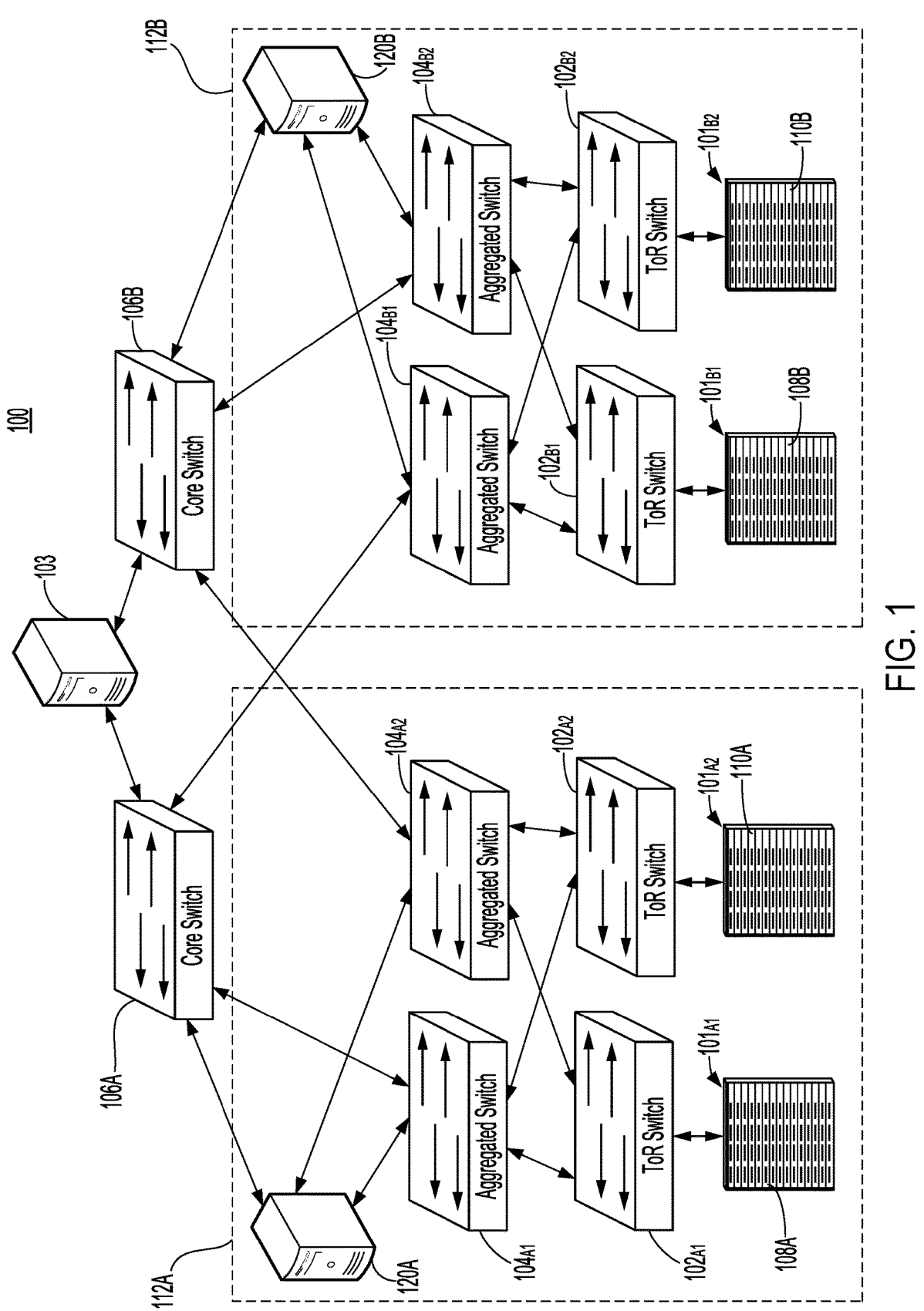
FIG. 1 is a block diagram of an example system for implementing data transmission scheduling according to one or more embodiments.

FIG. 1 illustrates an example system 100 for implementing disaggregated memory with data transmission scheduling according to one or more embodiments. As shown in FIG. 1, racks $101_{A1}$, $101_{A2}$, $101_{B1}$, and $101_{B2}$ use Top of Rack (ToR) switches $102_{A1}$, $102_{A2}$, $102_{B1}$, and $102_{B2}$, respectively, to communicate with network devices in system 100. Each rack 101 includes one or more network devices, such as processing nodes 108A and 108B that can access shared memory in other network devices, such as in memory nodes 110A and 110B or another processing node providing shared memory. In some implementations, system 100 in FIG. 1 may be used as at least part of a data center and/or cloud architecture for applications executed by processing nodes in system 100, such as for distributed machine learning or big data analysis.

Processing nodes 108 can include, for example, Central Processing Units (CPUs), Application Specific Integrated Circuits (ASICs), Graphics Processing Units (GPUs), or other processing units that execute applications that access memory that may be local to the processing node and/or external to the processing node, such as an external shared memory at a memory node 110 or at another processing node. In this regard, memory nodes 110 can include, for example, Solid-State Drives (SSDs), Hard Disk Drives (HDDs), Solid-State Hybrid Drives (SSHDs), ASICs, Dynamic Random Access Memory (DRAM), or other memory devices, such as solid-state memories, that are made available to processing nodes in system 100.

While the description herein refers to solid-state memory generally, it is understood that solid-state memory may comprise one or more of various types of memory devices such as flash integrated circuits, NAND memory (e.g., Single-Level Cell (SLC) memory, Multi-Level Cell (MLC) memory (i.e., two or more levels), or any combination thereof), NOR memory, Electrically Erasable Programmable Read Only Memory (EEPROM), other discrete Non-Volatile Memory (NVM) chips, or any combination thereof. In other implementations, memory nodes 110 and/or processing nodes 108 may include Storage Class Memory (SCM), such as, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), 3D-XPoint memory, and/or other types of solid-state memory, for example.

The network devices in system 100 can communicate via, for example, a Storage Area Network (SAN), a Local Area Network (LAN), and/or a Wide Area Network (WAN), such as the Internet. In this regard, one or more of racks 101, ToR switches 102, aggregated switches 104, core switches 106, scheduling servers 120, and/or network controller 103 may not be physically co-located. Racks 101, ToR switches 102, aggregated switches 104, core switches 106, scheduling servers 120, and/or network controller 103 may communicate using one or more standards such as, for example, Ethernet and/or Non-Volatile Memory express (NVMe).

As shown in the example of FIG. 1, each of racks $101_{A1}$, $101_{A2}$, $101_{B1}$, and $101_{B2}$ is connected to a ToR switch or edge switch 102. In other implementations, each rack 101 may communicate with multiple ToR or edge switches 102 for redundancy.

Aggregated switches $104_{A1}$ and $104_{A2}$ route messages between the TOR switches 102A and core switch 106A and scheduling server 120A. In some implementations, racks $101_{A1}$ and $101_{A2}$ with TOR switches $102_{A1}$ and $102_{A2}$, aggregated switches $104_{A1}$ and $104_{A2}$, and scheduling server 120A form cluster 112A of network devices in system 100. Aggregated switches 104, TOR switches 102, and/or core switches 106 can include, for example, P4 programmable switches, such as a Barefoot Networks Tofino Application Specific Integrated Circuit (ASIC) with ports configured to provide 40 Gigabit Ethernet (GE) frame rates. Other types of programmable switches can include, for example, a Cavium Xpliant programmable switch or a Broadcom Trident 3 programmable switch.

Aggregated switches $104_{B1}$ and $104_{B2}$ route messages between the ToR switches 102B and core switch 106B and scheduling server 120B. In some implementations, racks $101_{B1}$ and $101_{B2}$ with TOR switches $102_{B1}$ and $102_{B2}$, aggregated switches $104_{B1}$ and $104_{B2}$, and scheduling server 120B form cluster 112B of network devices in system 100. Core switches 106A and 106B can include high capacity, programmable switches that route messages between clusters 112A and 112B. As discussed in more detail below, core switches 106 in some implementations may be programmed to provide additional scheduling information to processing nodes that may take into account traffic load information or packet reception capability for multiple clusters across system 100.

Those of ordinary skill in the art will appreciate that system 100 can include many more network devices than those shown in the example of FIG. 1. For instance, system 100 may include other clusters of racks 101, TOR switches 102, aggregated switches 104, and/or scheduling servers 120.

Scheduling servers 120 can collect traffic load information and/or packet reception capacity information concerning the memory demand of different applications at different processing nodes and the capability of the processing nodes and/or memory nodes to receive more packets. Scheduling servers 120 may use the traffic load information and/or the packet reception capacity information to determine scheduling information for processing nodes in system 100 that is sent to particular processing nodes that can use the scheduling information in assigning time slots of a predetermined time period (i.e., a localized round for the processing node)

to different transmission queues associated with respective applications for sending packets to network devices via the network.

In some implementations, each core switch 106 can provide an additional level of scheduling information in addition to the scheduling information provided by one of scheduling servers 120. In such implementations, both scheduling servers 120 and core switches 106 can be referred to as network scheduling devices. The scheduling information provided by the network scheduling devices can indicate, for example, at least one of a change in a number of available time slots for at least one subsequent predetermined time period, a change in time slot assignment for a transmission queue, a change in a priority for data flows including packets sent from a transmission queue, an availability of a memory node to perform memory requests, and a level of congestion of packets sent to a memory node.

Each processing node 108 can use a queue module to enqueue packets including memory messages from different applications into corresponding transmission queues according to the application that issued the memory message. The queue module can also determine traffic load information and/or packet reception capacity information for the node that may be used by a scheduling module of the processing node to assign time slots to the different transmission queues for sending the packets. As discussed in more detail below, such scheduling at the processing nodes can provide a more efficient and faster assignment of network resources, while helping to guarantee certain Quality of Service (QOS) requirements for particular applications, such as real-time applications.

As used herein, memory messages can refer to messages received from or sent to an application concerning memory blocks stored in or to be stored in memory, such as a read request, a write request, a message granting or requesting a permission level for a memory block, or an acknowledgment of a memory operation. In addition, a memory block as used herein can refer to byte-addressable data, such as a cache line, or may refer to page-sized data. A memory request can refer to a type of memory message to access a memory, such as a read/load request or a write/store request.

Network controller 103 may serve as a Software Defined Networking (SDN) controller that manages the control of data flows in system 100 between the switches. In such SDN systems, network controller 103 can provide scalable and fine grain control by installing and updating custom forwarding rules at programmable switches, such as at core switches 106, aggregated switches 104, and/or ToR switches 102. The custom forwarding rules can provide a per-flow data link that can be assigned, and in some cases dedicated, to a data flow in a real-time or in a nearly real-time manner. This programmability at the switches can facilitate the distributed time scheduling disclosed herein by having the processing nodes assign time slots for a predetermined time period to applications or corresponding transmission queues based on the network resource demands of the applications executing at the processing nodes, and in some cases, based on scheduling information received from a scheduling server 120 and/or a core switch 106 to adjust the time scheduling in view of cluster-wide or system-wide network traffic.

In contrast to current approaches involving Time Division Multiple Access (TDMA) link scheduling for memory systems, the time scheduling disclosed herein does not rely primarily on a centralized scheduling device. Instead, the processing nodes manage their own scheduling to avoid the need to tightly synchronize all of the processing nodes in the network, which limits scalability and introduces significant overhead. In addition, the distributed time scheduling disclosed herein reduces the amount of network communications that would otherwise be required between all of the processing nodes and the centralized scheduling device for each round of scheduling. Moreover, the distributed time scheduling disclosed herein can more quickly adapt to the changing network demands of the applications since the processing nodes have nearly immediate information on the network demands of the applications being executed at the processing node. The distributed time scheduling disclosed herein is also more resilient than a centralized scheduling system where a problem with the centralized scheduling device affects the entire network.

Those of ordinary skill in the art will appreciate with reference to the present disclosure that other implementations may include a different number or arrangement of racks 101, ToR switches 102, aggregated switches 104, core switches 106, scheduling servers 120, and network controller 103 than shown in the example of FIG. 1. In this regard, system 100 in FIG. 1 is for illustration purposes, and those of ordinary skill in the art will appreciate that system 100 may include many more racks 101, clusters, switches, or routers than shown in the example of FIG. 1. In some variations, one or both of scheduling servers 120 may be omitted in favor of scheduling information being provided by a core switch 106. As another variation, network controller 103 may be omitted, such as in an implementation where system 100 does not use SDN.

Figure 2:
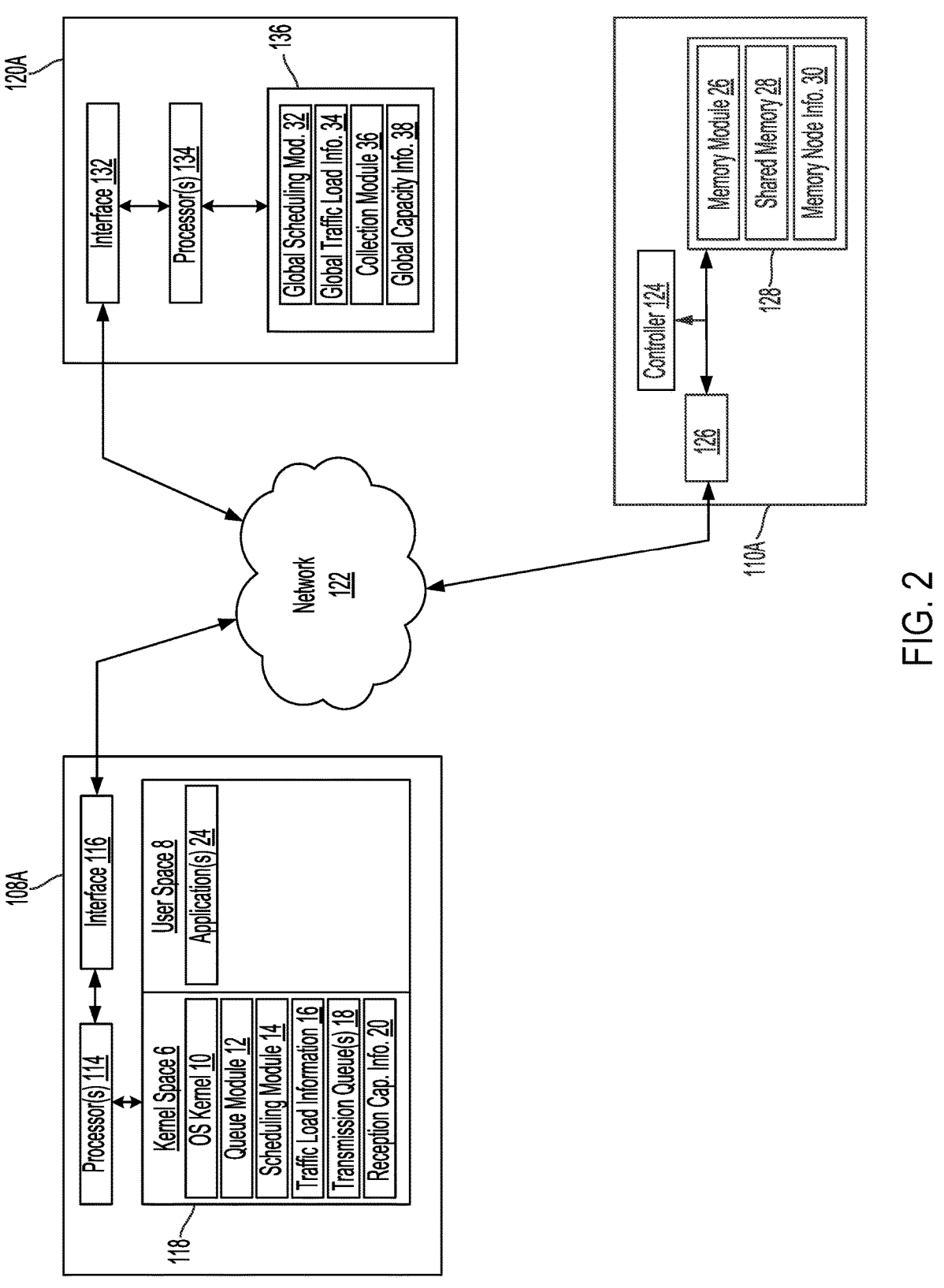
FIG. 2 is a block diagram of example devices in the system of FIG. 1 according to one or more embodiments.

FIG. 2 is a block diagram of example devices in system 100 of FIG. 1 according to one or more embodiments. As shown in FIG. 2, processing node 108A includes one or more processors 114, a network interface 116, and a local memory 118. These components of processing node 108A may communicate with each other via a bus, which can include, for example, a Peripheral Component Interconnect express (PCIe) bus. In some implementations, processing node 108, memory node 110A, and scheduling server 120A may be NVMe over Fabric (NVMe-oF) network devices configured to communicate with other network devices, such as other processing nodes and memory nodes, using NVMe messages (e.g., NVMe commands and responses) that may be, for example, encapsulated in Ethernet packets using Transmission Control Protocol (TCP). In this regard, network interface 116 of processing node 108A may include a Network Interface Cards (NIC), a network interface controller, or a network adapter.

In other implementations, processing node 108A can include a smart NIC as its network interface. In such implementations, the smart NIC includes its own processor and local memory that can be used for the disclosed time slot scheduling, traffic load information collection and reporting, packet reception capacity information collection and reporting, and/or transmission queue packet enqueuing. For example, an eBPF program may be run by the smart NIC to offload some or all of these operations from processor(s) 114.

Processor(s) 114 in FIG. 1 can execute instructions, such as instructions from one or more user space applications (e.g., applications 24) loaded from local memory 118, or from an Operating System (OS) kernel 10. Processor(s) 114 can include circuitry such as, for example, a CPU, a GPU, a microcontroller, a Digital Signal Processor (DSP), an ASIC, a Field Programmable Gate Array (FPGA), one or more RISC-V cores, hard-wired logic, analog circuitry and/ or a combination thereof. In some implementations, processor(s) 114 can include a System on a Chip (SoC), which may be combined with local memory 118.

Local memory 118 can include, for example, a volatile Random Access Memory (RAM) such as Static RAM (SRAM), Dynamic RAM (DRAM), or a non-volatile RAM, or other solid-state memory that is used by processor(s). Data stored in local memory 118 can include, for example, instructions loaded from an application or from an OS for execution by the processor, and/or data used in executing such applications, such as user data.

As shown in the example of FIG. 2, local memory 118 of processing node 108A includes a kernel space 6 that is used by OS kernel 10 and a user space 8 that is used by one or more user space applications 24. Kernel space 6 and user space 8 can include separate portions of virtual memory mapped to physical addresses in local memory 118. As will be understood by those of ordinary skill in the art, access to kernel space 6 is generally restricted to OS kernel 10, its kernel extensions, and other portions of an OS, such as device drivers, while access to user space 8 is available to applications 24, in addition to the OS. In this regard, the OS of processing node 108A allocates hardware and software resources, such as memory, network, and processing resources of the processing node. In the example of FIG. 2, kernel space 6 includes OS kernel 10, queue module 12, scheduling module 14, traffic load information 16, one or more transmission queues 18, and packet reception capacity information 20.

Queue module 12 can be used by the kernel to handle memory messages received from applications 24 in user space 8 to communicate with memory nodes via network 122. As discussed in more detail below, queue module 12 can measure or determine the traffic load of individual applications and collect traffic load information, which can include, for example, a priority for a data flow including related packets in a transmission queue, a length of such a data flow, a QoS setting for the data flow, a number of packets in a transmission queue 18 (e.g., a time limit for performing a memory request, a timeout value for receiving a response, an amount of jitter or variation in latencies for a data flow sent to different nodes, a minimum throughput, or an acceptable amount of packet loss), a number of packets in a corresponding transmission queue, and a number of pending memory requests issued by an application that have not been completed. Queue module 12 may also measure or determine packet reception capacity information that can indicate an ability of processing node 108A to receive packets from another network device, such as an indication of a fullness of a receive side ring buffer of interface 116.

In addition, queue module 12 can enqueue packets including memory messages received from application(s) 24 that are to be sent to memory nodes via interface 116. The location of queue module 12 in kernel space 6 can enable the queue module to parse packets in the kernel space 6 to identify a target location and information from the application that can be used for traffic load information 16, such as a QoS metric from the application, a total length of a data flow including packets for an application, and a number of pending memory requests issued by an application that have not been completed. Queue module 12 can use information that identifies the application that issued the memory request, such as a requestor ID, a port number, or a socket ID to determine in which transmission queue 18 the packet should be enqueued or whether a new transmission queue needs to be created for one or more packets received from an application starting a new data flow to a memory node.

In some implementations, queue module 12 may operate in one or more layers of a network stack of OS kernel 10, such as in an Internet Protocol (IP) layer and/or Ethernet layer of a network stack to access a destination address and tag packets to be sent for a data flow with a priority indicator. In this regard, queue module 12 in some implementations can include an extended Berkeley Packet Filter (eBPF) program executed as an extension of the Linux kernel (Linux® is the registered trademark of Linus Torvalds in the U.S. and other countries). Notably, eBPF can enable reprogramming of the kernel behavior without requiring changes to the kernel source code.

Queue module 12 in some implementations can set an 802.1Qbb Priority-based Flow Control (PFC) Indicator for the packets to identify different data flows corresponding to a priority determined by queue module 12. Network devices such as programmable switches or memory nodes may then prioritize processing of higher priority data flows over lower priority data flows. In addition, network scheduling devices, such as a scheduling server 120 or a core switch 106, may use the priority indicators to identify different flows from the same processing node. In this regard, queue module 12 may assign and tag each concurrently enqueued data flow at processing node 108A with different priority indicators to distinguish the different data flows beyond the source and destination information (e.g., source IP address and destination IP address in an IP header of the packet) or information associated with the sending and receiving applications (e.g., source port number and destination port number in the transport layer header of the packet).

In some implementations, queue module 12 may determine the relative priorities of concurrent data flows based on at least one of a time limit setting or QoS setting for the data flow and an indication of a remaining amount of data to be transmitted for the data flow such that data flows with similar time limits for transmission can be prioritized based on how much data for the data flow remains to be transmitted with larger remaining amounts having a higher priority. This can help prevent longer data flows from being blocked by more frequent shorter data flows, while still maintaining QoS requirements for latency.

Scheduling module 14 can assign time slots for a predetermined time period or round to the different transmission queues 18 for sending packets from the transmission queue during the predetermined time period. Like queue module 12, scheduling module 14 may operate in a network stack of OS kernel 10. In some implementations, scheduling module 14 may also be an eBPF program.

In assigning the time slots, scheduling module 14 can use traffic load information 16 that includes information about the different data flows enqueued in transmission queues 18 to, for example, assign more time slots to data flows with a higher priority, a greater length (i.e. a greater number of packets), a shorter time limit for transmission or reception, a transmission queue or issuing application with a greater number of enqueued packets, or for an application with a greater number of pending or outstanding memory requests. The predetermined time period may be on the order of, for example, tens or hundreds of microseconds and the time slots may be on the order of single digit microseconds.

Scheduling module 14 may also use packet reception capacity information 20 in assigning time slots. In some implementations, packet reception capacity information 20 can indicate a level of fullness of a receive-side ring buffer of interface 116 or other packet reception queue for processing node 108A, such as a higher layer reception queue in OS kernel 10. If the packet reception capacity information 20 indicates a fullness of a reception queue exceeds a threshold level, such as 75%, or otherwise indicates a limited packet reception capacity, scheduling module 14 in some implementations may lower its packet transmission rate by assigning less time slots per predetermined time period or by limiting the number of transmission queues 18 that can send packets during the predetermined time period. This may lead to less return packets, such as from memory nodes returning requested data or acknowledgments, during a subsequent time period so that scheduling module 14 can increase the packet transmission rate when packet reception capacity information 20 indicates an increase in packet reception capacity.

In some implementations, scheduling module 14 may not consider packet reception capacity information 20 and may rely primarily on traffic load information 16. In such implementations, queue module 12 may still update packet reception capacity information 20 to provide such information to network scheduling devices, such as scheduling server 120A or a core switch 106, by piggybacking packet reception capacity information 20 onto packets sent onto network 122 for other reasons, such as to request data from a memory node 110. Queue module 12 may piggyback traffic load information and/or packet reception capacity information onto outgoing packets or may periodically report traffic load information and/or packet reception capacity information to a network scheduling device, such as if this information has not been added to any outgoing packets within a certain number of predetermined time periods.

Scheduling module 14 may also consider scheduling information received from network scheduling devices in assigning time slots to the different transmission queues 18. For example, scheduling module 14 may assign less time slots to a transmission queue 18 that includes a data flow to be sent to a memory node that may have limited packet reception capacity or a data flow with a lower priority than another data flow from another processing node being sent to the same memory node. This type of cluster-wide or system-wide scheduling information may be provided to processing node 108A by the network scheduling device.

In the example of FIG. 2, memory node 110A includes interface 126, controller 124, and memory 128. Interface 126 may communicate via network 122 using a standard such as, for example, Ethernet. As will be appreciated by those of ordinary skill in the art, interface 126 can be included as part of controller 124. In some implementations, interface 126 can include, for example, a NIC, smart NIC, network interface controller, or network adapter.

Controller 124 can execute instructions, such as instructions from memory module 26, which monitors usage of shared memory 28 by network devices (e.g., processing nodes 108) via network 122. Controller 124 can include circuitry such as one or more RISC-V cores or other type of CPU core, a GPU, a microcontroller, a DSP, an ASIC, an FPGA, hard-wired logic, analog circuitry and/or a combination thereof. In some implementations, controller 124 can include an SoC, which may be combined with one or both of memory 128 and interface 126.

Memory 128 of memory node 110A can include, for example, volatile RAM such as SRAM, DRAM, non-volatile RAM, such as SCM, or other solid-state memory. Shared memory 28 of memory 128 is used by processing nodes 108 as an external or remote main memory, or for data storage to store and retrieve data for applications being executed by the processing nodes. In other implementations, memory node 110A can include multiple shared memories that may provide different tiers of storage or different memory access capabilities such as faster read and/or write performance or larger storage capacity.

In monitoring usage of shared memory 28, memory module 26 generates or collects memory node information 30, which may include information on a capability of memory node 110A to process memory requests, such as information on pending submission queues for read requests and write requests, and packet reception capacity information, such as an indication of a level of fullness of a receive-side ring buffer of interface 126 or other packet processing queue. Memory module 26 can add memory node information 30 or portions thereof to outgoing packets sent on network 122 for use by network scheduling devices, such as scheduling server 120A. In some implementations, memory module 26 may add the memory node information 30 by piggybacking the memory node information on packets intended for other network devices, such as with acknowledgments or responses to memory requests received from processing nodes. In other cases, memory module 26 may send the memory device information directly to a network scheduling device to periodically report its status, such as if memory node 110A has not reported any memory node information within a certain period of time.

Scheduling server 120A provides scheduling information for different processing nodes throughout cluster 12A. The scheduling information can include, for example, indications in a change of a number of time slots for a predetermined time period, a change in time slot assignment for a transmission queue associated with a data flow, a change in priority for data flows sent from a transmission queue, an availability of a memory node to perform memory requests, and a level of congestion of packets sent to a memory node. The processing node may then adjust its time slot assignments for one or more subsequent time periods based on the scheduling information received from scheduling server 120A to better balance network traffic and/or memory demand throughout cluster 12A. As noted above, another network scheduling device, such as a core switch 106 may provide additional scheduling information for the processing device.

Unlike centralized approaches to TDMA discussed above, the network scheduling devices in the disclosed distributed scheduling system of system 100 do not need to provide schedule assignments to each processing node for every predetermined time period or round, which improves scalability, reduces network traffic, and reduces system overhead, due in part to obviating the synchronization problems of centralized TDMA. Scheduling server 120A can instead collect global traffic load information 34 and global capacity information 38 and provide scheduling information to certain processing nodes as needed to improve an overall network resource usage for cluster 12A.

As discussed in more detail below with reference to FIG. 8, scheduling server 120A retrieves traffic load information and/or packet reception capacity information added to packets sent by processing nodes to collect global traffic load information 34. The traffic load information and/or the packet reception capacity information from the processing nodes can be added to the packets by queue modules at the processing nodes by piggybacking the information for the processing node onto outgoing packets to reduce network traffic overhead, as compared to sending dedicated messages for providing the traffic load information and/or packet reception capacity information from all of the processing nodes to the network scheduling devices. Scheduling server 120A can instead snoop network traffic at switches, such as aggregated switches 104 or TOR switches 102, to retrieve the traffic load information and/or packet reception capacity information for the processing nodes. The retrieved traffic load information and/or packet reception capacity information is collected by collection module 36 of scheduling server 120A as global traffic load information 34 to determine scheduling information using global scheduling module 32 for applications and their associated transmission queues across cluster 12A.

In addition, global scheduling module 32 may also consider memory node information retrieved from packets sent by memory nodes, such as a number of pending requests for a memory node and packet reception capacity of the memory node. This information may be added to outgoing packets from memory nodes (e.g., memory nodes 110 in FIG. 1) or by processing nodes that provide shared memory. The processing nodes may also provide their own packet reception capacity information by adding this information to outgoing packets. Scheduling server 120A can periodically snoop the network traffic at switches to retrieve the memory node information and packet reception capacity information from the packets. Collection module 36 collects the retrieved memory node information and packet reception capacity information of the memory nodes as global capacity information 38, which may also include indications of congestion retrieved from snooped packets on the network. In this regard, a processing node or a memory node may add an indication of congestion to a field in a packet, for example, to indicate that a queue or average queue length for pending requests at its shared memory have reached a threshold level, such as 75% full.

Processor or processors 134 of scheduling server 120A can include circuitry such as a CPU, a GPU, a microcontroller, a DSP, an ASIC, an FPGA, hard-wired logic, analog circuitry and/or a combination thereof. In some implementations, processor or processors 134 can include an SoC, which may be combined with one or both of memory 136 and interface 132. Memory 136 can include, for example, a volatile RAM such as DRAM, a non-volatile RAM, or other solid-state memory that is used by processor(s) 134 to store data. Scheduling server 120A communicates with network devices, such as processing nodes 108 and memory nodes 110, via interface 132, which may interface according to a standard, such as Ethernet.

Those of ordinary skill in the art will appreciate with reference to the present disclosure that other implementations of processing node 108A, memory node 110A, or scheduling server 120A may include a different arrangement than shown in the example of FIG. 2. In this regard, the modules, programs, and data structures shown in FIG. 2 may differ in other implementations. For example, processing node 108A can include a different number of modules than shown in FIG. 2, such as in implementations where queue module 12 and scheduling module 14 may be combined into a single module. As another example variation, traffic load information 16 may form part of another data structure stored in a kernel space, such as a flow table.

Figures 3, 4:
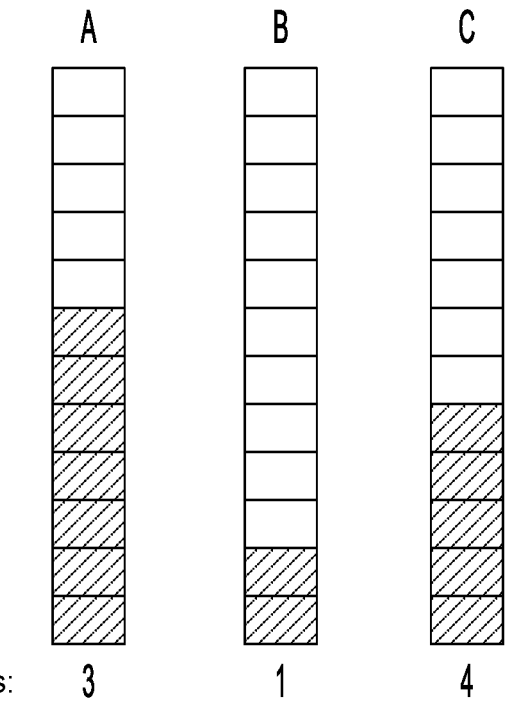
FIG. 3 illustrates an example of traffic load information according to one or more embodiments.
FIG. 4 illustrates an example of assigning time slots to transmission queues based on the traffic load information of FIG. 3 according to one or more embodiments.

FIG. 3 illustrates an example of traffic load information 16 according to one or more embodiments. In the example of FIG. 3, traffic load information 16 may be stored as a table or other type of data structure such as a Key Value Store (KVS) in kernel space 6 of processing node 108A. Traffic load information 16 includes information on the applications that are executed at processing node 108A and their corresponding transmission queues and data flows. Global traffic load information 34 stored by scheduling server 120A in FIG. 2 may include similar information as that shown for traffic load information 16 of FIG. 3, but with traffic load information associated with applications, data flows, and transmission queues throughout cluster 12A. Global traffic load information 34 may also include packet reception capacity information for the processing nodes, as discussed above with reference to scheduling server 120A of FIG. 2.

As shown in FIG. 3, traffic load information 16 includes application or transmission queue identifiers (i.e., A, B, C) that identify different applications being executed by processing node 108A that are sending memory messages via a corresponding transmission queue. Each application or transmission queue is associated in traffic load information 16 with a priority, a total data flow length (i.e., "DF length" in FIG. 3), a QoS time limit setting (i.e., "time limit" in FIG. 3) for the data flow to be received by a memory node, a number of packets in the corresponding transmission queue, and a number of pending memory requests (e.g., read/load requests and write/store requests) issued by the application.

As shown in the example of FIG. 3, each of applications A, B, and C have a different priority, which can help a scheduling module of the processing node assign time slots to the different corresponding transmission queues, as well as help a network scheduling device, such as scheduling server 120A, identify the different data flows. In cases where an application may have multiple data flows enqueued in its transmission queue, the priority for traffic load information 16 can be the highest priority assigned to the different data flows that are enqueued for the application or may be an average value of the priorities of the different data flows for the application. In some implementations, all of the data flows from a particular application may be assigned the same priority at a given point in time.

Queue module 12 may set the different priorities by considering the time limit setting for each application or data flow. In cases where two data flows have no time limit setting or have the same or a similar time limit setting (e.g., within 2 ms of each other), the queue module may consider a difference between the total data flow length and the packets currently in the transmission queue for the data flow, which can provide an indication of the remaining amount of data to be sent for the data flow. In such cases, the queue module can assign a higher priority to the data flow that has more remaining data to send.

For example, application C, or the transmission queue for application C in FIG. 3, may be given the highest priority of "1" due to having the shortest time limit setting of 5 ms, but applications A and B having the same time limit setting of 8 ms may cause queue module 12 to consider the remaining amount of data to be sent for the data flows from applications A and B. In the example of FIG. 3, application A has seven packets in its transmission queue and a total data flow length of seven packets, compared to application B having two packets in its transmission queue and a total data flow length of two packets. Application A, or its corresponding transmission queue, is then given a higher priority of "2" in this example since it has more remaining data to send for its data flow. The data flow length in traffic load information 16 may, in some implementations, consider the number of packets for multiple data flows issued by the same application that have not been completely sent by the processing node and are therefore still in the corresponding transmission queue.

In considering how many, if any, time slots to assign to a transmission queue during a predetermined time period, scheduling module 14 can also consider the number of packets in the queue and a pending number of memory requests for the application in addition to a priority given to the transmission queue. For example, application C in FIG. 3 has sixteen pending memory requests, compared to two pending memory requests for application B, and eight pending memory requests for application A. The more pending memory requests for the application that have not been completed, the more likely the application is to stall, which can decrease the processing performance of processing node 108A, such as by leading to context switching at the processor to switch to a different task. This may factor into scheduling module 14 assigning more time slots to the transmission queue for application A than it would otherwise assign if application A had less pending memory requests than applications B and C. The queue module 12 may track the completed and outstanding memory requests for different applications.

In addition, a large number of packets in the transmission queue for an application may also result in a temporary increase in the assignment of time slots to that transmission queue in response to the number of enqueued packets exceeding a threshold number of packets approaching a total capacity for the transmission queue to prevent the packets from being dropped.

As discussed above, processing node 108A may receive scheduling information from a network scheduling device, which may also adjust the assignment of time slots. For example, processing node 108A may receive scheduling information that may change the priority of one of the data flows, specify a reassignment of a time slot from one data flow sent from processing node 108A to another data flow sent from processing node 108A, or may provide information on the availability or congestion of a memory node that may cause the reassignment of time slots to a different application that is sending packets to a less congested or more available memory node. As another example, the scheduling information may include a pause frame sent by the network scheduling device under the 802.1Qbb PFC standard to temporarily pause a particular data flow associated with a certain priority or indicating a number of time slots to not assign for one or more subsequent predetermined time periods to temporarily reduce the packets being sent by the processing node.

By using localized traffic load information for the applications executing at the processing node 108A, scheduling module 14 can act faster to adjust slot assignments as compared to a centralized scheduling system that would need to report to a network scheduling device and wait for an assignment from the network scheduling device before changing its data transmission schedule.

As will be appreciated by those of ordinary skill in the art with reference to the present disclosure, traffic load information 16 may include different information than shown in FIG. 3. For example, some implementations of traffic load information 16 may instead flag applications or transmission queues that have a number of pending memory requests or a number of enqueued packets greater than a threshold level. As another example variation, the priority may not be included as part of traffic load information 16 since scheduling module 14 may determine the priority of a data flow based on the information included in traffic load information 16 and simply add the priority to the outgoing packets for the data flow. As another example variation, queue module 12 may separately keep track of data flows or memory requests to write data versus requesting data since writing data may typically consume more network resources than sending a request to read data.

FIG. 4 illustrates an example of assigning time slots to transmission queues based on the traffic load information of FIG. 3 according to one or more embodiments. As shown in FIG. 4, scheduling module 14 of processing node 108A assigns three time slots to the transmission queue for application A, one time slot to the transmission queue for application B, and four time slots to the transmission queue for application C. The total number of time slots for a predetermined period of time, such as 80 microseconds, can include the sum of the eight time slots assigned to transmission queues for applications A, B, and C. In such an example, each time slot would be for 10 microseconds, meaning that transmission queue A would have 30 microseconds to send packets, transmission queue B would have 10 microseconds to send packets, and transmission queue C would have 40 microseconds to send packets. The order of sending the packets can be, for example, in order of the assigned priorities for the applications or may instead be based on a different consideration, such as the greatest number of enqueued packets.

As will be appreciated by those of ordinary skill in the art with reference to the present disclosure, the example assignment of time slots in FIG. 4 is for the purpose of illustration and other implementations may differ from the example shown in FIG. 4. For example, other implementations may include more or less transmission queues and many more enqueued packets and assigned time slots than shown.

Example Processes

FIG. 5 is a flowchart for a data transmission scheduling process according to one or more embodiments. The process of FIG. 5 can be performed by, for example, at least one processor 114 of processing node 108A executing queue module 12 and scheduling module 14, and/or by a processor of a smart NIC executing a queue module and/or a scheduling module. In this regard, some implementations of the data transmission process can include one or both of the queue module and the scheduling module being performed by a smart NIC of the processing node.

In block 502, at least one processor of the processing node executes one or more applications that are allocated memory of at least one shared memory of one or more memory nodes via a network. The application(s) may issue memory messages, such as memory requests, to be sent to the one or more memory nodes. In some cases, only a subset of the applications being executed may issue memory requests that are to be sent to a network device providing a shared memory. In such cases, only those applications issuing memory requests to be sent on the network can have transmission queues.

In block 504, at least one processor of the processing node can use a queue module (e.g., queue module 12) to enqueue packets from the one or more applications into one or more transmission queues. Each packet can include a corresponding memory message, such as a memory request to access shared memory, permission to modify data stored in the shared memory, or memory messages to establish a connection with a memory node. Each packet is enqueued into a corresponding transmission queue for the application issuing the memory message. In cases where the memory message is the first memory message to be sent from the application, the queue module may create a new transmission queue for sending packets to the memory node. The queue module may identify the application using, for example, a socket ID or port number for the application and may identify the memory node using a destination address for the memory node.

In block 506, the at least one processor may use a scheduling module (e.g., scheduling module 14) to assign one or more time slots of a predetermined time period to a transmission queue for sending at least a portion of the packets enqueued in the transmission queue within the assigned time slot(s). The assignment of the time slot or time slots to the transmission queue can be based on, for example, traffic load information as discussed above for FIG. 3 and/or packet reception capacity for the processing node to temporarily lessen the packets being received by the processing node in response to memory messages sent by the processing node. In some cases, the assignment of time slots may also be dependent on scheduling information received from a network scheduling device, such as scheduling server 120A or a core switch 106, which may specify priorities for packets issued from different applications or adjustments to time slot assignments, such as reassigning one or more time slots from a transmission queue for one application to a transmission queue for a different application.

The scheduling information may also include memory node information, such as a packet reception capacity of one or more memory nodes that are receiving data flows from the processing node or a capability of the memory node to process memory requests. In some implementations, the scheduling information may include network congestion information that may affect the assignment of time slots to the transmission queue or may include a change to a number of available time slots available for a subsequent predetermined time period or time periods, such as by sending a pause frame under the 802.1Qbb PFC standard for a particular flow, or indicating a number of time slots to not assign for the subsequent predetermined time period or periods.

In block 508, the at least one processor can tag packets to be sent for a data flow with a priority indicator. As discussed above, the priority indicator can include an 802Qbb PFC priority value added to the packet to identify the data flow and its relative priority to other data flows that may be handled by a programmable switch and/or memory node in the system. The programmable switch or memory node may prioritize processing of higher priority packets or data flows over other packets and data flows that are either not marked with a priority indicator or that have a lower priority.

In block 510, the processing node sends at least a portion of the packets from the transmission queue to a target memory node during the one or more time slots assigned to the transmission queue. In some cases, the assigned time slots can be long enough to send all the packets enqueued in the transmission queue. In other cases, the assigned time slots may not provide enough time to send all of the packets enqueued in the transmission queue. In such cases, the remainder of the packets can be sent during a subsequent predetermined time period, which may include more assigned time slots due to, for example, a larger number of packets being enqueued, a greater number of outstanding memory requests from the application, and/or more data remaining from a data flow that has not been sent.

Those of ordinary skill in the art will appreciate with reference to the present disclosure that the data transmission scheduling process of FIG. 5 may differ in other implementations. For example, in some implementations, the tagging of packets in block 508 may occur before the assignment of time slots in block 506.

FIG. 6 is a flowchart for a time slot reassignment process according to one or more embodiments. The process of FIG. 6 can be performed by, for example, at least one processor 114 of processing node 108A executing queue module 12 and scheduling module 14, and/or by a processor of a smart NIC executing a queue module and/or a scheduling module. The time slot reassignment process of FIG. 6 can be performed as part of the data transmission scheduling process of FIG. 5 in that the scheduling module can consider the addition of new data flows and/or the completion of current data flows in assigning time slots in block 506 of FIG. 5 and the queue module can consider the creation of new data flows when enqueuing packets for a new data flow in block 504.

In block 602 of FIG. 6, the queue module executed by the at least one processor identifies at least one of a new data flow issued by a different application and an end of a current data flow issued by an application that currently has a transmission queue. The new data flow can include one or more memory messages issued by a different application that does not already have a transmission queue. The queue module can in some implementations identify the new data flow by parsing the new memory message(s) or parsing one or more packets that contain the new memory message(s) to identify a port number or requestor ID for the application. In other implementations, the queue module may use a socket ID assigned to the application by the OS kernel to identify the application.

In cases where a data flow ends or has been completely sent for an application, the queue module may detect a sequence number or total length indicated by the last packet for the data flow. In some cases, the application issuing the completed data flow may have additional data flows that are queued into its transmission queue. However, the completion of the sending of the data flow can affect the assignment of time slots to the transmission queue for a subsequent predetermined time period. In other cases, there may not be any additional data flows to send for the application. In such cases, the queue module may wait for an additional predetermined time period or for a certain number of subsequent predetermined time periods without assigning any time slots to the inactive transmission queue before its removal.

In block 604, the at least one processor of the processing node uses a scheduling module to assign time slots for a subsequent predetermined time period to at least one transmission queue based at least in part on the identification of at least one of the new data flow and the end of the current data flow in block 602. The time slots that were assigned to a transmission queue that completed sending a current data flow may be redistributed or reassigned to other transmission queues for other applications or time slots may be proportionately reassigned or redistributed from other transmission queues to a new transmission queue for a new data flow from a different application that did not previously have a transmission queue.

The foregoing time slot reassignment process can provide for a faster and more efficient assignment of time slots than other TDMA approaches that rely on a centralized time scheduler to receive information from nodes and send time slot assignments back to the nodes. The time slot reassignments discussed herein can dynamically react to changes in network resource demands within one or two predetermined time periods or rounds, which can be within, for example, a few hundreds of microseconds in some implementations.

FIG. 7 is a flowchart for a data transmission scheduling process based on scheduling information received from a network scheduling device according to one or more embodiments. The process of FIG. 7 can be performed by, for example, at least one processor 114 of processing node 108A executing queue module 12 and scheduling module 14, and/or by a processor of a smart NIC executing a queue module and/or a scheduling module. The data transmission scheduling process of FIG. 7 can be performed as part of the data transmission scheduling process of FIG. 5 in that the scheduling module can consider the scheduling information received from a network scheduling device in assigning time slots in block 506 of FIG. 5.

In block 702 of FIG. 7, at least one processor of the processing node uses a queue module to add at least one of traffic load information for one or more transmission queues and packet reception capacity information for the processing node to one or more outgoing packets sent by the processing node. The queue module may, in some implementations, add traffic load information to outgoing packets, such as the priorities, data flow lengths, data flow time limits, packets in a transmission queue, and/or pending memory requests issued by an application. This piggybacking of information to outgoing packets can reduce network congestion by not sending dedicated messages to a network scheduling device (e.g., scheduling server 120A or core switch 106) to report this information. In other implementations, the processing node may report the packet reception capacity and/or traffic load information periodically to the network scheduling server or may report this information in a dedicated message if a predetermined amount of time has elapsed without adding this information to outgoing packets.

In block 704, the processing node receives scheduling information from at least one of a scheduling server and a programmable switch. The dashed line in FIG. 7 between blocks 702 and 704 indicates that the receipt of scheduling information may not be immediately in response to the addition of traffic load information and/or packet reception capacity information in block 702. Instead, the network scheduling device may collect traffic load information and/or packet reception capacity information from multiple network devices (e.g., other processing nodes and memory nodes) throughout a cluster or across multiple clusters to determine the scheduling information sent to the processing node in block 704. In this regard, the scheduling information sent to the processing node in some cases may not even be based on the traffic load information or packet reception capacity information sent by the processing node, but may instead consider, for example, a reduced packet reception capacity of a memory node with a shared memory being accessed by an application executing at the processing node.

In block 706, at least one processor of the processing node uses the scheduling module to assign time slots for a subsequent predetermined time period or subsequent round to at least one transmission queue based at least in part on the received scheduling information. The scheduling information can include, for example, at least one of an indication of a change in a number of available time slots for at least one subsequent predetermined time period, a change in time slot assignment for a transmission queue (e.g., a pause frame for a priority value retrieved from a data flow), a change in a priority for data flows including packets sent from a transmission queue, an availability of a memory node to preform memory requests, and a level of congestion of packets sent to a memory node.

Some of the received scheduling information may have more of a direct effect on the assignment of time slots than other scheduling information. For example, the processing node may receive an indication that the number of available time slots to assign should be decreased by two for the next two predetermined time periods to effectively lower the transmission rate of the processing node. As another example, the processing node may receive a pause frame from the network scheduling device for a particular transmission queue indicating that the processing node is not to send any packets for the corresponding application for a certain number of predetermined time periods. In another example, the processing node may receive an indication that one or more time slots should be reassigned from a first application's transmission queue to a second application's transmission queue.

Other types of scheduling information may have less of a direct effect on the assignment of time slots by the scheduling module but may factor into other considerations made by the scheduling module in assigning time slots. For example, the scheduling information may indicate that a change in priority for data flows sent by an application, such as to decrease a priority for data flows from an application that may be competing with data flows having a shorter QoS time limit from another processing node that are being sent to the same memory node. As another example, the scheduling information may consider a high level of congestion for a memory node or a limited packet reception capacity of the memory node so that the scheduling module may assign one or more additional time slots to a different transmission queue than it would have otherwise assigned.

Those of ordinary skill in the art will appreciate that other implementations may include a different order or arrangement for blocks 702 to 706. For example, some implementations may not add traffic load information or packet reception capacity information to outgoing packets in block 702 but may still receive scheduling information from a network scheduling device that may be based only on information collected from memory nodes.

FIG. 8 is a flowchart for a scheduling information determination process performed by a network scheduling device according to one or more embodiments. The process of FIG. 8 can be performed by, for example, at least one processor 134 of scheduling server 120A executing collection module 36 and global scheduling module 32. The scheduling information determination process may alternatively or additionally be performed by a programmable switch, such as a core switch 106.

In block 802, at least one processor of the network scheduling device uses a collection module to retrieve traffic load information from packets sent by a plurality of processing nodes to network devices, such as memory nodes. The traffic load information can indicate a network traffic load generated by the processing nodes. In retrieving the traffic load information, switches in the network may be programmed to identify and extract the traffic load information and forward it to the network scheduling device.

As discussed above with reference to FIG. 3, the traffic load information can include, for example, priorities for data flows sent by the processing nodes, data flow lengths for different data flows from the processing nodes, QoS time limits or other QoS information for different data flows, a number of packets in different transmission queues at the processing nodes, and a number of pending memory requests for different applications executing at the processing nodes. The network scheduling device may aggregate the retrieved traffic load information into global traffic load information (e.g., global traffic load information 34 in FIG. 2) representing a traffic load from different applications being executed across a system or cluster of network devices including the plurality of processing nodes.

In block 804, the collection module executed by at least one processor of the network scheduling device retrieves packet reception capacity information from packets sent by at least one of the plurality of processing nodes and a plurality of memory nodes. The packet reception capacity information can indicate the capability of the processing nodes and/or memory nodes to receive packets, such as a level of fullness of a receive-side ring buffer of the processing node or memory node. In retrieving the packet reception capacity information, switches in the network may be programmed to identify and extract the packet reception capacity information and forward it to the network scheduling device. The network scheduling device may then aggregate the retrieved packet reception capacity information into memory node information (e.g., memory node information 30 in FIG. 2) for memory nodes and into global traffic load information for the processing nodes. As discussed above, the memory node information may also include other information received from the memory nodes, such as a number of pending memory requests to be performed for a shared memory of the memory node.

In block 806, a global scheduling module of the network scheduling device determines scheduling information for at least one processing node based at least in part on the retrieved traffic load information and the retrieved packet reception capacity information. As discussed above the scheduling information can include, for example, at least one of an indication of a change in a number of available time slots for at least one subsequent predetermined time period, a change in time slot assignment for a transmission queue, a change in a priority for data flows including packets sent from a transmission queue, an availability of a memory node to preform memory requests, and a level of congestion of packets sent to a memory node.

In some implementations, the scheduling information may be determined for particular applications at the processing nodes that may be identified as, for example, contributing to a high level of congestion at a memory node, having its memory messages blocked by more aggressive or demanding applications executed at other processing nodes, or generating data flows that are blocking other applications from sending memory messages to a memory node. In some cases, the scheduling information may consider the packet reception capacity of processing nodes that have competing data flows and may, for example, reduce a priority for the data flows issued by the processing node that has a more limited packet reception capacity so as to slightly favor the data flows from the processing node with a greater packet reception capacity to reduce a likelihood of the limited reception processing node from receiving too many response packets.

In block 808, the network scheduling device sends the determined scheduling information to at least one processing node. In some cases, the network scheduling device may only send scheduling information to particular processing nodes as needed, such as when a packet reception capacity of a memory node falls below a threshold, when a number of pending memory requests for an application rises above a threshold level, or when applications are otherwise identified by the network scheduling device as needing to adjust their data transmission rates.

In some implementations, the network scheduling device may follow a default schedule for sending scheduling information to one or more processing nodes in a cluster that have the most network traffic, such as once per second. In addition, the processing nodes may also receive scheduling information from another scheduling device at a higher tier in the system, such as from a core switch that may have access to traffic load information and packet reception capacity information for multiple clusters.

Those of ordinary skill in the art will appreciate with reference to the present disclosure that the order of the blocks in FIG. 8 may vary in different cases. For example, the retrieval of packet reception capacity information in block 804 may precede the retrieval of traffic load information in block 802 depending on when packets including this information are identified by programmable switches on the network. In some implementations, one of block 802 or block 804 may be omitted such that the determination of network scheduling information may only be based on one of the snooped traffic load information or the snooped packet reception capacity information.

The foregoing assignment of time slots in a distributed manner at processing nodes throughout a network can provide a faster and more dynamic scheduling that is better suited to the changing traffic loads of applications as compared to using a centralized time scheduling device to assign time slots to the different processing nodes. Without needing to tightly synchronize all of the processing nodes, it is possible to better scale to larger systems and reduce the overhead and network traffic created by frequent communication between all of the processing nodes and a centralized time scheduling device. In addition, the use of network scheduling devices in a distributed scheduling system as disclosed herein to collect traffic load information and/or packet reception capacity for processing nodes and/or memory nodes throughout a cluster or across multiple clusters can improve the sharing of network resources by reducing traffic bottlenecks and providing fairer resource sharing among applications in the system.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A processing node, comprising:
a network interface configured to communicate with one or more memory nodes via a network, the one or more memory nodes each configured to provide a respective shared memory via the network; and
at least one processor configured, individually or in combination, to:
execute one or more applications, wherein the one or more applications are allocated memory of at least one shared memory of the one or more memory nodes;
enqueue a plurality of packets into one or more transmission queues for sending the plurality of packets via the network interface to the one or more memory nodes, wherein each packet of the plurality of packets includes a corresponding memory message from an application of the one or more applications for a memory node of the one or more memory nodes, and wherein each packet of the plurality of packets is enqueued into a corresponding transmission queue of the one or more transmission queues according to which application of the one or more applications issued a memory message included in the packet;
assign one or more time slots of a predetermined time period to a transmission queue of the one or more transmission queues for sending at least a portion of the packets enqueued in the transmission queue within the assigned one or more time slots; and
send the at least a portion of the packets from the transmission queue via the network interface to a target memory node of the one or more memory nodes during the one or more time slots assigned to the transmission queue.

2. The processing node of claim 1, wherein the at least one processor is further configured, individually or in combination, to assign the one or more time slots to the transmission queue based on traffic load information for the one or more transmission queues.

3. The processing node of claim 2, wherein traffic load information for the transmission queue includes at least one of a priority of a data flow including one or more packets in the transmission queue, a length of the data flow, a Quality of Service (QOS) setting for the data flow, a number of packets in the transmission queue, and a number of pending memory requests issued by the application associated with the transmission queue that have not been completed.

4. The processing node of claim 3, wherein the at least one processor is further configured, individually or in combination, to determine the priority of the data flow based on at least one of a time limit setting for the data flow to be received by the target memory node and an indication of a remaining amount of data to be transmitted for the data flow.

5. The processing node of claim 1, wherein the at least one processor is further configured, individually or in combination, to:

tag packets to be sent for a data flow with a priority indicator, the data flow including a set of packets in the transmission queue; and wherein, based on the priority indicator, at least one of a programmable switch on the network and the target memory node are configured to prioritize processing at least one of the data flow and the set of packets over processing at least one of another data flow and another packet not included in the set of packets.

6. The processing node of claim 1, wherein the at least one processor is further configured, individually or in combination, to:

identify at least one of:

a new data flow including packets issued by a different application, and an end of a current data flow including packets issued by the application or by another application of the one or more applications; and assign time slots for a subsequent predetermined time period to at least one transmission queue the one or more transmission queues based at least in part on the identification of at least one of the new data flow and the end of the current data flow.

7. The processing node of claim 1, wherein the at least one processor is further configured, individually or in combination, to add at least one of traffic load information for the one or more transmission queues and packet reception capacity information for the processing node to one or more outgoing packets sent by the processing node to the network via the network interface.

8. The processing node of claim 1, wherein the at least one processor is further configured, individually or in combination, to:

receive, via the network interface, scheduling information from at least one of a scheduling server and a programmable switch on the network; and assign time slots for a subsequent predetermined time period to at least one transmission queue of the one or more transmission queues based at least in part on the received scheduling information.

9. The processing node of claim 1, further comprising at least one local memory; and wherein the at least one processor is further configured, individually or in combination, to execute a program in a kernel space of the at least one local memory to assign time slots of the predetermined time period to the one or more transmission queues.

10. A method performed by a processing node, the method comprising:

executing one or more applications, wherein the one or more applications are allocated memory of at least one shared memory of one or more memory nodes that are each configured to provide a respective shared memory via a network;

enqueuing a plurality of packets into one or more transmission queues for sending the plurality of packets to the one or more memory nodes, wherein each packet of the plurality of packets includes a corresponding memory message from an application of the one or more applications for a memory node of the one or more memory nodes, and wherein each packet of the plurality of packets is enqueued into a corresponding transmission queue of the one or more transmission queues according to which application of the one or more applications issued a memory message included in the packet;

assigning, based at least in part on traffic load information for the one or more transmission queues, one or more time slots of a predetermined time period to a transmission queue of the one or more transmission queues for sending at least a portion of the packets enqueued in the transmission queue within the assigned one or more time slots; and sending the at least a portion of the packets from the transmission queue during the one or more time slots assigned to the transmission queue.

11. The method of claim 10, wherein traffic load information for the transmission queue includes at least one of a priority of a data flow including one or more packets in the transmission queue, a length of the data flow, a Quality of Service (QOS) setting for the data flow, a number of packets in the transmission queue, and a number of pending memory requests issued by the application associated with the transmission queue that have not been completed.

12. The method of claim 11, further comprising determining the priority of the data flow based on at least one of a time limit setting for the data flow to be received by the target memory node and an indication of a remaining amount of data to be transmitted for the data flow.

13. The method of claim 10, further comprising:

tagging packets to be sent for a data flow with a priority indicator, the data flow including a set of packets in the transmission queue; and wherein, based on the priority indicator, at least one of a programmable switch on the network and the target memory node are configured to prioritize processing of at least one of the data flow and the set of packets over processing at least one of another data flow and another packet not included in the set of packets.

14. The method of claim 10, further comprising:

identifying at least one of:

a new data flow including memory messages issued by a different application, and an end of a current data flow including memory messages issued by the application or by another application of the one or more applications; and assigning time slots for a subsequent predetermined time period to at least one transmission queue of the one or more transmission queues based at least in part on the identification of at least one of the new data flow and the end of the current data flow.

15. The method of claim 10, further comprising adding at least one of traffic load information for the one or more transmission queues and packet reception capacity information for the processing node to one or more outgoing packets sent by the processing node to the network.

16. The method of claim 10, further comprising:

receiving scheduling information from at least one of a scheduling server and a programmable switch on the network; and assigning time slots for a subsequent predetermined time period to at least one transmission queue of the one or more transmission queues based at least in part on the received scheduling information.

17. The method of claim 10, further comprising executing a program in a kernel space of at least one local memory of the processing node to assign time slots of the predetermined time period to the one or more transmission queues.

18. A network scheduling device, the network scheduling device comprising:

a network interface configured to communicate with a plurality of processing nodes on a network, wherein the plurality of processing nodes is configured to access shared memories at a plurality of memory nodes on the network; and means for:

retrieving, from packets sent on the network by the plurality of processing nodes, traffic load information for one or more transmission queues at each of the plurality of processing nodes, wherein each processing node is configured to enqueue packets including memory messages from one or more applications to access a shared memory, and wherein the packets are enqueued into one or more transmission queues according to the application of the one or more applications that issued a memory message in the packet;

determining scheduling information for at least one processing node of the plurality of processing nodes based at least in part on the retrieved traffic load information; and sending the determined scheduling information to the at least one processing node, wherein the at least one processing node is configured to assign one or more time slots of a predetermined time period to at least one transmission queue of the one or more transmission queues for sending at least a portion of the packets enqueued in the at least one transmission queue within the assigned one or more time slots.

19. The network scheduling device of claim 18, further comprising means for:

retrieving, from packets sent on the network by at least one of the plurality of processing nodes and the plurality of memory nodes, packet reception capacity information for the at least one of the plurality of processing nodes and the plurality of memory nodes; and determining the scheduling information for the at least one processing node of the plurality of processing nodes based at least in part on the retrieved packet reception capacity information.

20. The network scheduling device of claim 18, wherein the scheduling information is configured to indicate at least one of a change in a number of available time slots for at least one subsequent predetermined time period, a change in time slot assignment for a transmission queue of the one or more transmission queues, a change in a priority for data flows including packets sent from the transmission queue, an availability of a memory node of the plurality of memory nodes to perform memory requests, and a level of congestion of packets sent to the memory node.

\* \* \* \* \*